March 31, 1959 A. C. MULDER 2,880,374
ARC WELDING MACHINE
Filed April 29, 1957
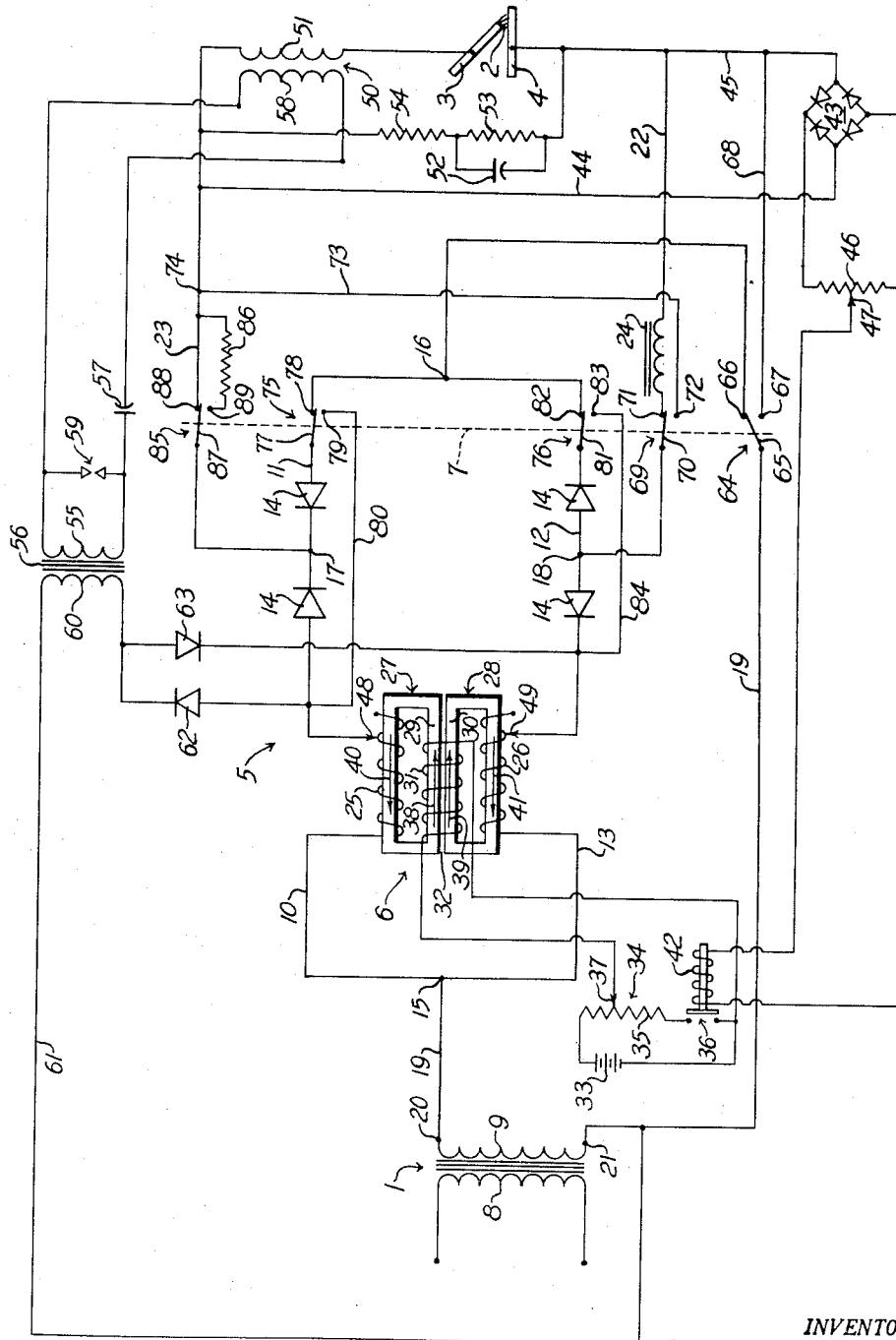
INVENTOR.
ALLAN C. MULDER
BY
Andrus & Scales
Attorneys

United States Patent Office 2,880,374
Patented Mar. 31, 1959

2,880,374

ARC WELDING MACHINE

Allan C. Mulder, Appleton, Wis., assignor to Miller Electric Manufacturing Company, Appleton, Wis., a corporation of Wisconsin Application April 29, 1957, Serial No. 655,641

20 Claims. (Cl. 315—205)

This invention relates to an arc welding machine and in particular to an arc welding machine having saturable reactor current control.

The use of arc welding to join metal members has been constantly increasing in recent years. Some applications are better adapted to the use of an alternating current, hereinafter referred to as an A.C. current, to maintain the arc while other applications are better suited to the use of a direct current, hereinafter referred to as a D.C. current, to maintain the arc. To avoid the necessity of having separate machines to supply the A.C. current and the D.C. current, it is known to provide a combination A.C.-D.C. machine which supplies one or the other current, as required. Suitable switching is provided for converting from one output to the other.

In either form of arc welding, different current values are employed for various welding jobs. A very simple and convenient apparatus to control the magnitude of the welding current is a saturable reactor. In this form of control, a winding carried by an iron core or the like is inserted in the alternating current portion of the circuit. A direct current saturating winding is linked with the core to vary the saturation of the core and consequently the reactance of the alternating current winding and to thereby control the output current.

Applicant has found that if the positive half cycle of the welding current flows through one reactance winding and the negative half cycle of the welding current flows through a different reactance winding and if the magnetic circuit of each is saturated with a D.C. flux which adds to the flux established by the alternating current, a very smooth and stable arc is obtained in both alternating current and direct current welding.

A simple circuit for division of the positive and negative current through separate reactance windings in an alternating current welding circuit is obtained by connecting the reactance windings in parallel with each other and in series with the arc and connecting oppositely polarized rectifiers one in series with each of the reactance windings.

In a direct current welding circuit, a full wave bridge rectifier or the like is connected to a suitable alternating current input and provides a direct current output. The present invention may be adapted to this form of machine by connecting a separate reactance winding in each of the branch circuits which alternately carry the positive and the negative cycles of the input current. A direct current saturating winding means is magnetically coupled to the reactance windings and connected to establish self-saturation; i.e., saturation in the same direction as the alternating current.

To convert a direct current welding circuit of the preceding construction to an alternating current welding circuit, simple switching is employed to connect the branches of the bridge rectifier which contain the reactance windings with each other to provide alternate paths in series with the electrode and work across the A.C. input.

Initial striking of the arc in both A.C. and D.C. arc welding is improved with maximum saturation of the saturable reactor cores. The reactance drop across the load windings is inversely proportional to the saturation and consequently a minimum voltage drop arises with maximum saturation. The lower the reactance drop, the greater is the portion of the source current available during striking of the arc.

In accordance with one aspect of the present invention, a voltage responsive means is connected across the arc and momentarily connects the saturation winding to a controllable direct current source with an increased D.C. current in the winding. When employing a conventional resistance potentiometer, the D.C. current is momentarily increased by opening the low side of the potentiometer connection to establish only a series connection of the resistance of the potentiometer and the D.C. saturating winding with respect to the direct current source.

In both A.C. and D.C. arc welding, radio frequency energy at a high voltage is advisably inserted into the arc welding circuit supplying current to the arc to assist in initially striking the arc. In A.C. arc welding the radio frequency energy also assists in restriking the arc each time the welding current passes through zero and thereby provides a more stable arc. The magnitude of the radio frequency energy preferably decreases after the initial arc is struck. However, where the source of the energy is powered from a constant potential welding transformer or the like, there is no drop in the output voltage of the transformer upon establishment of the arc, and consequently no drop in the radio frequency energy inserted into the welding circuit.

In accordance with another aspect of the present invention, a pair of reversely connected rectifiers are connected in series with an input to a radio frequency source and each additionally in series with a corresponding load current winding. The output of the radio frequency source is connected in the arc welding circuit. The rectifiers carry the respective positive and negative portions of the current to the input for the radio frequency source to establish an A.C. input. The load windings insert a reactance drop in the circuit which is dependent upon the welding current. Thus, when the arc is struck, the welding current increases, the voltage drop across the load windings increases and a lower voltage, equal to the source voltage minus the voltage drop across the load current winding, is applied to the input of the radio frequency source.

In alternating current arc welding applications, current rectification occurs in the arc which inserts a D.C. component in the welding current. This D.C. component is particularly large when welding aluminum or the like with a tungsten electrode and deleteriously effects the weld. It has been suggested that the D.C. component be cancelled by the insertion of a resistance element in the more conductive half cycle of the current. However, the resistance must be continuously adjusted for different values of welding current to maintain a small D.C. component.

In still another aspect of the present invention, the reactance of the two load current windings is adjusted relative to each other to cancel the D.C. component established by rectification in the arc. This method of varying the relative conductivity of the alternately active load current windings maintains a smaller D.C. component over a wide range of welding current. The use of a resistance in series with the otherwise more conductive load current winding increases still further the width of the range of current output over which a small D.C. component is maintained.

The present invention provides a very stable arc in a welding circuit having saturable reactor control for both D.C. and A.C. arc welding. A simple switching means is provided to convert from one type of output to the other.

The accompanying drawing illustrates the best mode presently contemplated by the inventor for carrying out the invention.

The drawing is a schematic circuit having certain components shown more or less diagrammatically to more clearly illustrate the invention.

Referring to the drawing, welding apparatus is shown including a transformer 1 to establish and maintain an arc 2 between an electrode 3 and a workpiece 4. A control circuit 5 is connected in the welding circuit between the transformer 1 and the arc 2. The control circuit 5 includes a saturable reactor assembly 6 to control the magnitude of the welding current and a bank of simultaneously actuated switches 7 to selectively supply an A.C. or D.C. welding current to the arc 2.

The illustrated transformer 1 is a single phase variety having a primary winding 8 adapted to be connected to a set of A.C. input power lines, not shown, such as in the conventionally available distribution system supplying sixty cycle current. A secondary winding 9 is magnetically coupled to the primary winding. The primary winding 8 and the secondary winding 9 are so arranged as to establish a nearly constant potential output voltage across the secondary to strike and maintain the arc 2. The bank of switches 7 is shown in a position to establish a D.C. welding current in the arc 2.

D.C. welding circuit

With the bank of switches 7 in the full line position, as shown, the control circuit 5 is connected in a rectifying bridge including four legs or branches 10, 11, 12 and 13, respectively, which are connected in a closed loop.

Each of the branches 10 through 13 includes a suitable rectifier 14 preferably of the dry plate type which permits appreciable current flow in only one direction therethrough.

The rectifiers 14 are connected to establish a pair of input terminals 15 and 16 at one set of opposite junctions in the closed loop, and a pair of output terminals 17 and 18 at the other set of opposite junctions.

The input terminals 15 and 16 are respectively shown at the junction of branches 10 and 13 and the junction of the branches 11 and 12.

The output terminals 17 and 18 are respectively shown at the junction of branches 10 and 11 and the junction of branches 12 and 13.

The rectifiers 14 in branches 10 and 13 are oppositely connected with respect to the adjacent input terminal 15 to carry alternate half cycles of current to and from terminal 15. Similarly, rectifiers 14 in branches 11 and 12 are oppositely connected with respect to the adjacent input terminal 16 to carry alternate half cycles of current to and from the terminal 16. Further, the rectifiers 14 in the branches 10 and 11 adjacent the output terminal 17 and rectifiers 14 in the branches 12 and 13 adjacent the output terminal 18 are similarly polarized with respect to the corresponding terminals 17 and 18, to allow current flow in the same direction with respect thereto. This establishes the conventional full wave bridge rectifying circuit.

The input terminals 15 and 16 are connected across the secondary winding 9 by a pair of leads 19 which are connected to terminals 20 and 21 of the secondary winding.

The output terminals 17 and 18 are connected to the electrode 3 and the work 4 respectively by a pair of output leads 22 and 23. The output lead 22 contains a conventional stabilizing reactor 24 to reduce ripple in the direct current supplied to the arc 2.

The magnitude of the welding current is controlled by the saturable reactor assembly 6 which includes a load current winding 25 connected in series with rectifier 14 in branch 10 and a load current winding 26 connected in series with rectifier 14 in branch 13. The windings 25 and 26 are each wound on a separate rectangular core 27 and 28, each of which provides a substantially closed high permeable path for the flux established by the current in the associated winding. The cores 27 and 28 are disposed with generally correspondnig adjacent portions 29 and 30 around which a direct current saturating winding 31 is wound. The adjacent portions 29 and 30 are disposed in spaced relation to establish an air gap 32 therebetween and maintain each path independent of the other.

The saturating winding 31 is connected to a suitable direct current source, shown for purposes of illustration as a battery 33 with a resistance potentiometer 34 connected therebetween.

A resistance 35 of the potentiometer 34 is connected across the battery 33 in series with a set of normally closed relay contacts 36 for a purpose more fully described hereinafter.

The winding 31 is adjustably connected across the potentiometer resistance 35 by a permanent connection of one side of winding 31 to the connection or junction of the battery 33 and the contacts 36 and by a movable tap or sliding contact connection 37 to the resistance 35. The sliding contact 37 allows continuous adjustment of the direct current flowing in winding 31. Consequently, the saturation of the cores may be adjusted to vary the reactance of the load current windings 25 and 26.

The load current windings 25 and 26 are wound upon the respective cores 27 and 28 such that with the current flow allowed by the rectifiers 14 a flux is always established which is in the same direction in the respective cores as the flux established therein by the saturating winding 31. For example, if winding 31 establishes flux in the cores as shown in the drawing by the arrows 38 and 39 on the respective core portions 29 and 30, then the windings 25 and 26 are so wound as to establish a flux as shown in the drawing by the arrows 40 and 41 on the cores adjacent the windings 25 and 26.

As previously set forth, during initial striking of an arc 2, a relatively high direct current in the saturating winding 31 establishes a low reactance in the load current windings 25 and 26 and a high available current across the electrode 3 and the work 4 during striking of the arc 2. In accordance with the present invention, the relay contacts 36 are controlled by a relay winding 42 which is responsive to the arc voltage to momentarily establish a relatively high direct current in the saturating winding 31 during striking of the arc 2.

An auxiliary full-wave bridge type rectifier 43, employed in the A.C. circuit hereinafter described to convert to a direct current, has its input connected across the arc 2 by a pair of leads 44 and 45 and its output connected across a voltage level adjusting potentiometer 46. The relay winding 42 is adjustably connected across the potentiometer 46 by a movable tap connection 47 which is adjusted to change the voltage level required across the arc 2 to provide the necessary energization of relay winding 42 to close the relay contacts 36.

To increase the range of control, each of the windings 25 and 26 is shown provided with a tap connector 48 and 49 respectively. The adjustment of taps 48 and 49 establishes a relatively large step adjustment of the output current while the saturating winding 31 is employed to obtain fine adjustment between each step adjustment.

An auxiliary radio frequency energy component is introduced into the welding circuit by a conventional air core coupling transformer 50 having a secondary winding 51 connected in the welding circuit in series with the arc 2 to insert a high frequency voltage and current component into the arc welding circuit. A capacitor 52 having a low impedance at high frequencies and a resistance 53 are connected in parallel with each other and in series with another resistance 54 across the arc 2 to establish a low impedance by-pass line across the other circuit components to divert the high frequency current therefrom.

The radio frequency energy is generated by a conventional spark gap oscillator which is shown for purposes of illustration as including a high voltage secondary winding 55 of a power transformer 56 connected in series with a tank capacitor 57 and a primary winding 58 of the air core coupling transformer 50. A spark gap 59 is connected across the high voltage secondary winding 55 to establish damped trains of radio frequency oscillations which are introduced into the welding circuit via the air core coupling transformer 50.

The primary winding 60 of the power transformer 56 is connected to the secondary winding 9 of the welding current transformer to supply an alternating current to the radio frequency generating circuit. The one side of the primary winding 60 is connected directly to the one side of the secondary winding 9 of the main transformer 1 by a lead 61. The opposite side of the primary winding 60 is connected to the junction of the reactance winding 25 and rectifier 14 of branch 10 by a half-wave rectifier 62 and also to the junction of the load current winding 26 and rectifier 14 of branch 13 by a half-wave rectifier 63. The rectifiers 62 and 63 are polarized to carry the positive and negative portions respectively, of the alternating current established by the transformer 1 and carried respectively by the windings 25 and 26.

The operation of the direct current welding circuit as described heretofore is as follows:

For the purposes of this description, it is assumed that during the positive half cycles of current in the secondary 9 of the transformer 1, current flow is from the upper secondary terminal 20 to the input terminal 15 through the arc welding circuit to the opposite input terminal 16 and then back to the lower secondary terminal 21 from the input terminal 16. The current flow with respect to the terminals 15 and 16 during the negative half cycle of the secondary current is in the opposite direction.

Therefore, during the positive half cycle, the current flows as follows: from the secondary winding 9 to terminal 15 and then through the load current winding 25 and rectifier 14 of branch 10 to output terminal 17. The current cannot flow through winding 26 to the other output terminal 18 due to the blocking action of rectifier 14 in branch 13. The current then flows from the output terminal 17 via the line 23 to the electrode 3 and through the arc 2 to the work 4 to maintain the arc. From the work 4, the current flows through the other output lead 22, including the stabilizing reactor 24, to the output terminal 18 connecting branch 13 and branch 12. From the output terminal 18, the current flows through the rectifier 14 in branch 12 to the other input terminal 16 and back to the secondary winding 9 to complete the positive half cycle.

During the negative half cycle of the current wave, the path is traced as follows: from the winding 9 via the lead 19 to the input terminal 16 in branches 11 and 12 and then through the branch 11 to the terminal 17. The current cannot flow through branch 12 because of the blocking action of the rectifier 14 in branch 12. From the terminal 17 in branch 11, the current flows via lead 23 to the electrode 3 and through the arc 2 to the work 4 to maintain the arc. From the work, the current flows via line 22 and reactor 24 through the other output terminal 18 and then back to the secondary winding 9 via branch 13 including rectifier 14 and load current winding 26 and the lead 19. Thus the current flows in the same direction through the arc 2 during both the positive and negative cycles of current.

The positive and negative half cycles of the current wave flow respectively through the load current windings 25 and 26. The cores 27 and 28 which carry the corresponding windings 25 and 26 are adjustably saturated by the D.C. winding 31 to establish self saturation. This provides a smooth and stable arc 2.

The air gap 32 between the cores 27 and 28 prevents the flux in either core from flowing in the other core and maintains individual action of the cores.

The magnitude of this D.C. welding current is controlled by the setting of taps 48 and 49 and also by adjustment of the potentiometer tap 37 to vary the saturation effect of winding 31.

As the arc 2 is in the process of being established, the relatively high open circuit voltage of the secondary winding 9 appears across the electrode 3 and the work 4. The high open circuit voltage is also applied to the auxiliary control rectifier 43 which allows a direct current to pass to the relay winding 42. The current is sufficiently large to energize the relay winding 42 to open the relay contacts 36 and disconnect the one side of the potentiometer 34 from the battery 33. The resistance 35 of the potentiometer 34 between the tap 37 and battery 33 is now only connected as a series resistance with the D.C. saturating winding 31. Therefore, the voltage drop across this series resistance is reduced and a higher voltage is applied across the saturating winding 31. Consequently, an increased D.C. current flows therethrough. This increases the saturation of the cores 27 and 28 and correspondingly reduces the reactance drop across the windings 25 and 26. This increases the current available to establish the arc 2 between the electrode 3 and the workpiece 4.

Once the arc 2 is established and welding current flows through the previously described paths, the welding current increases and an appreciable voltage drop appears across the load current windings 25 and 26 and the voltage across the arc 2 is correspondingly reduced. This reduced arc voltage also appears across the auxiliary rectifier 43 with a consequent reduced direct current to the relay winding 42. The contacts 36 are released to a closed position and connect the potentiometer 34 in the usual adjustable potentiometer circuit arrangement. The current through the series resistance between the battery 33 and the movable tap connection 37 is now equal to the sum of the current through the D.C. saturating winding 31 and the current through the balance of the resistance 35. The voltage drop across the series resistance increases and the voltage across the D.C. saturating winding 31 decreases with a resultant decrease in the D.C. saturating current.

The radio frequency energy inserted via the air coupled transformer 50 into the welding circuit assists in establishment of the arc 2. During the positive half cycle of the voltage of the main transformer 1 current flows to the primary winding 60 of the high frequency power transformer 56 as follows: from the secondary winding 9 through the load current winding 25 in branch 10 and then through the rectifier 62 to primary winding 60 and back to the low side of the secondary winding 9 by way of conductor 61. During the negative portion of the main voltage wave, the current flow is as follows: from the low side of the secondary winding 9 by way of conductor 61 to and through the primary winding 60, through the opposite rectifier 63 to the branch 13 and back to the high side of the transformer secondary 9 through the load current winding 26.

After the arc 2 is established the voltage applied to the primary winding 60 decreases because of the increased voltage drop across the load current windings 25 and 26 as previously described. Consequently, the radio frequency power generated is substantially reduced as long as the arc 2 is maintained. This reduces establishment and transmission of radio frequency electromagnetic waves and minimizes the probability of interference with radio communication services.

If the arc 2 is broken, the radio frequency output is automatically increased to again assist in establishing the arc.

A.C. welding circuit

To convert from a D.C. welding current to an A.C. welding current, the bank of switches 7 is actuated to disenage certain contacts and to engage other contacts which establishes an alternating current circuit including the control circuit 5 and the arc 2 connected in series across the secondary winding 9 as presently described.

A first switch 64 of bank 7 is connected in the alternating current line 19 connecting secondary winding terminal 21 and the input terminal 16. The switch 64 includes a switch arm 65 permanently connected to the secondary winding and adapted to selectively engage a contact 66 or a contact 67. When engaging contact 66, the circuit between terminal 21 and input terminal 16 is complete to establish the D.C. rectifying circuit previously described. When the arm 65 engages the other contact 67, the terminal 21 of the secondary winding 9 is connected directly to the work 4 by way of a jumper lead 68.

A second switch 69 of the bank of switches 7 is provided with a common switch arm 70 connected to the D.C. output terminal 18 in branches 12 and 13. The switch arm 70 is adapted to selectively engage either of two contacts 71 and 72. The contact 71 is connected in the output line 22 and when engaged with switch arm 70 completes the output circuit between terminal 18 and the work 4 for the D.C. circuit previously described.

To change to an A.C. circuit, the switch arm 70 is engaged with the contact 72 which is connected to one end of a lead 73 which is connected at its opposite end to line 23 as at 74. The lead 73 connects the output terminals 17 and 18 together and thereby connects branches 10 and 13 in parallel with each other and in series with line 19 from the secondary winding 9 and the line 23 which is connected to the electrode 3. The branches 10 and 13 include the rectifiers 14 which are reversely connected with respect to the adjacent input terminal 15. Consequently, during the positive half cycle of the current wave, the current now flows through the rectifier 14 in branch 10 from line 19 and to line 23 and during the negative half cycle of the current wave, the current flows through the rectifier 14 in branch 13 from line 23 to 19 via the lead 73.

To increase the current capacity of the A.C. circuit, a switch 75 in branch 11 and a switch 76 in branch 12 are similarly connected to permit connection of the respective rectifiers 14 in parallel with the corresponding rectifiers 14 in branches 10 and 13.

The switches 75 and 76 constitute a part of the switch bank 7. The switch 75 includes a switch arm 77 which is ganged to switch arms 65 and 70 for simultaneous movement therewith. The switch arm 77 is connected to the input side of rectifier 14 in branch 11 and selectively engages a contact 78 when the switch bank 7 is disposed in a D.C. output position and engages a contact 79 when the switch bank is disposed in an A.C. output position. The contact 78 is connected to output terminal 16 and thus completes branch 11 in the previously described rectifying circuit. The contact 79 is connected to one end of a jumper lead 80 which is connected at the opposite end to the input side of rectifier 14 in branch 10. As the output side of the rectifiers 14 in branches 10 and 11 are connected together by terminal 17, these two rectifiers are connected in parallel with each other and also in series with the load current winding 25 in branch 10. Therefore, the A.C. current flow in branch 10 divides evenly between these two rectifiers and the total current which may flow through branch 10 is double that which would be allowable if only one of the rectifiers were in the circuit.

Similarly, switch 76 is provided with a common switch arm 81 which is adapted to be selectively engaged with either of two contacts 82 and 83. The switch arm 81 is connected to the output side of the rectifier 14 in branch 12 and the contact 82 is connected to the input terminal 16 to connect branch 12 in the rectifying circuit when the bank of switches 7 is in a D.C. output position. The contact 83 is connected to one end of a jumper lead 84 which has the opposite end connected to the output side of rectifier 14 in branch 13. Therefore, when switch arm 81 is moved from the D.C. position to the A.C. position and therefore engages contact 83, the output sides of rectifiers 15 in branches 12 and 13 are connected together. The input sides of these rectifiers 14 are connected by terminal 18. Therefore, the two rectifiers are connected in parallel with each other and in series with the load current winding 26 between the terminals 15 and 18 which define the branch 13.

A switch 85 is provided in line 23 between the output terminal 17 and the junction 74 with line 73. The switch is adapted to selectively connect a resistor 86 in the line 23 to reduce the conductivity of the one half cycle of the current in the alternating current arc welding circuit connection. The switch 85 includes a common switch arm 87 connected to the output terminal 17 and tied to the other switch arms of the switch bank 7. The switch arm 87 selectively engages a contact 88 and a contact 89 in the D.C. circuit position and the A.C. circuit position of switch bank 7, respectively. The contact 88 is connected directly to junction 74 and when engaged by switch arm 87 establishes the connection between terminal 17 and junction 74 in the D.C. circuit. Contact 89 is connected to one end of a resistor 86 which has the opposite end connected to the junction 74. When switch arm 87 engages contact 89, the direct connection between terminal 17 and junction 74 is broken and the resistor 86 serially connected therebetween to insert a resistance in line 23 during one half cycle of the welding current.

The D.C. saturating control of relay winding 42 and the high frequency circuit, both of which were fully described in the description of the direct current welding supply circuit, are connected unchanged in the alternating current circuit.

Thus, the relay winding 42 is energized from the output of the auxiliary rectifier 43 which has its input connected across the electrode 3 and the workpiece 4 and thus across the arc 2. The rectifier 43 rectifies the alternating current established by the arc voltage and provides a suitable direct current to the relay winding 42.

And, the primary winding 60 of the radio frequency input transformer 56 is energized from the main source, with the positive and negative portions of the current being supplied respectively through the rectifier 62 in series with the load current winding 25 and the rectifier 63 in series with the load current winding 26.

To describe the operation of the alternating current welding circuit as heretofore set forth, it is again assumed that during the positive half cycle of the current wave, the current flows from the upper terminal 20 of secondary winding 9 and through the welding circuit back to the lower terminal 21 and that during the negative half cycle of the current wave, the current flow is just reversed.

The positive half cycle may then be traced from the secondary winding as follows: from the lead 19 to terminal 15 and then through load current winding 25 and the now parallel connected rectifiers 14 of branches 10 and 11 to the terminal 17. The current cannot flow from the terminal 15 through branch 13 as the rectifiers 14 of branches 12 and 13 block current flow in this direction. From the terminal 17 in branches 10 and 11, the current flows via line 23 including the resistor 86 which is connected in circuit by switch 85 to the electrode 3, through the arc 2 to the work 4 and then back to the secondary winding 9 via the lead 68 and the line 19 which are now connected by the switch 64.

During the negative half cycle of current, the current flows from the terminal 21 of winding 9 via the line 19 and lead 68 to the work 4 then through the arc 2 to the electrode 3. The line 23 then carries the current from the electrode 3 to the terminal 18 via the lead 73. The current then flows through the paralleled rectifiers 14 in branches 12 and 13 and the load current winding 26 to the terminal 15 and then to the other terminal 20 of the secondary winding 9 via the line 19. The current cannot flow from line 23 including the resistor 86 during the negative half cycle as the rectifiers 14 in branches 10 and 11 block current flow in this direction.

During the positive cycles, the current flows through the load current winding 25, and during the negative cycles, the current flows through the load current winding 26 in the same relative direction as in the previously described D.C. welding circuit. Therefore, self-saturating reactors are inserted in both circuits.

The magnitude of the alternating current is established by the setting of taps 48 and 49 and by the adjustment of tap 37 of the potentiometer 34.

Thus, in both the A.C. and the D.C. circuit, alternately active load current windings are employed to carry the positive and negative portions of the alternating current. The windings are self-saturating and produce a very smooth and stable arc in both A.C. and D.C. arc welding.

The relay contacts 36 controlled by the arc voltage establish a momentary high saturation in the cores 27 and 28 and improve the arc striking characteristics of the welding circuit.

Similarly, the radio frequency energy superimposed across the electrode 3 and the workpiece 4 improves the arc striking characteristic in both the D.C. and the A.C. welding circuit. After the arc 2 is established, the high frequency voltage is substantially reduced as previously described to minimize the probability of interference with commercial communication services. However, a relatively low level of high frequency current is superimposed upon the A.C. welding current and assists in restriking of the arc 2 each time the main welding current passes through zero.

In A.C. arc welding, a greater current flows during one half cycle of the wave current than during the other half cycle. This difference arises because of the normal difference existing in the emissivity of the electrode and the work and is particularly present in welding aluminum and the like with a tungsten electrode. A D.C. current component is therefore superimposed upon the A.C. welding current. This D.C. current component contributes to instability of the arc.

Thus, in the illustrated circuit, the positive half cycle of the welding current flows through the arc 2 from the electrode 3 which has a high emissivity relative to the workpiece 4. The negative half cycle of welding current flows through the arc from the workpiece 4 which has a low emissivity relative to the electrode 3. As a result, the positive half cycle of current, unless otherwise controlled, is greater than the negative half cycle of current and a D.C. current component is superimposed upon the alternating current in the arc.

With the present invention, the D.C. current component may be eliminated either in full or in part by suitably adjusting the taps 48 and 49 to control the reactance of the load current windings 25 and 26 to reduce the reactance in the branch circuit which is active during the less conductive half cycle of the current wave relative to the reactance in the branch circuit which is active during the more conductive half cycle.

In the illustrated embodiment, the taps 48 and 49 are adjusted to provide a greater number of active turns of winding 25 in the circuit than of winding 26. The reactance inserted by the winding 25 during the positive half cycle of current flow, as previously set forth, is greater than that inserted by the winding 26 during the negative half cycle. The resistor 86 which is in series with the winding 25 also reduces the conductivity of the circuit during the positive half cycle of current due to the resistance of resistor 86. Therefore, by suitable adjustment of taps 48 and 49 and selection of resistor 86 the half cycles are equal or more nearly equal and the D.C. current component is eliminated or minimized over a wide current range.

The reactance of the windings 25 and 26 may also be suitably adjusted to cancel the D.C. component by creating different levels of saturation in the corresponding cores 27 and 28 in any suitable manner. Thus, separate D.C. control windings may be provided for each core and the D.C. saturating current in each adjusted to reduce the reactance in the branch circuit which is active during the less conductive half cycle of the current wave.

The resistor 86 may be eliminated and the D.C. current component eliminated or reduced for a selected current solely by suitable adjustment of taps 48 and 49. This would automatically maintain a small D.C. current component over a wide current range. However, the combination of the resistance of resistor 86 and the relative reactance adjustment of taps 48 and 49 increases the current range during which a small D.C. component is automatically maintained.

Where the output range of the welding machine is greater than the current range within which a small D.C. component is maintained for any one resistor, a tapped resistor may be conveniently employed to change from one range to another.

Although the control circuit is described with a transformer input, any other suitable input such as a generator may be employed.

The present invention provides a simple and inexpensive combined A.C.-D.C. arc welding machine having improved arc striking characteristics and an easily adjusted output current which maintains a good and stable arc characteristic.

Various modes of carrying out the invention are contemplated as being within the scope of the following claims particularly pointing out and distinctly claiming the subject matter which is regarded as the invention.

I claim:

1. In an A.C.-D.C. arc welding machine including a welding circuit adapted to be connected to an alternating current source and to selectively supply an alternating current or a direct current to an arc to be maintained between an electrode and a workpiece, a pair of branch circuits in said welding circuit each including a main half-wave rectifying means and a load current winding connected in series, magnetic core means for said load current windings, switch means having a first position adapted to connect said branch circuits in series with said arc to respectively transmit the positive and negative portions of the current from the source to said arc in the same direction with respect to the arc to supply a direct current to the arc, said switch means having a second position adapted to connect said branch circuits in series with said arc to respectively conduct the positive and negative portions of the current from the source to said arc in opposite directions with respect to the arc to supply an alternating current to said arc, a controllable source of direct current, saturating winding means disposed on said core means and connected to said source of direct current to provide adjustment of the saturation of the core means, voltage responsive means operatively associated with the controllable source of direct current and connected across the electrode and the workpiece and and responsive to the voltage therebetween to increase the current to the saturating winding means in the absence of an arc, a radio frequency source adapted to insert radio frequency energy into said welding circuit and having an input control rectifying means connecting said input and said load current windings to said alternating current source to carry the positive and negative portions of the current from said source to said input in parallel with said main rectifying means and said arc, said frequency source thereby establishing radio frequency energy having a high voltage in said welding circuit in the absence of an arc and radio frequency energy having a low voltage in said welding circuit in the presence of an arc.

2. In A.C.-D.C. arc welding apparatus including a welding circuit adapted to be connected to an alternating current source and to selectively supply an alternating current or a direct current to an arc to be maintained between an electrode and a workpiece, a pair of branch circuits in said welding circuit each including a half-wave rectifying means and a load current winding connected in series, magnettic core means for said load current windings, switch means having a first position adapted to connect said branch circuits in series with said arc to respectively supply the positive and negative portions of the current from the source to said arc in the same direction with respect to the arc to supply a direct current to the arc, and having a second position adapted to connect said branch circuits in series with said arc to respectively conduct the positive and negative portions of the current from the source to said arc in opposite directions with respect to the arc to supply an alternating current to said arc, and saturating means adapted to establish self-saturation of said magnetic core means.

3. An A.C.-D.C. arc welding apparatus adapted to be connected to an alternating current source and to selectively supply an alternating current or a direct current to an arc established between an electrode and a workpiece, which comprises a first and a second half-wave rectifying circuit each serially including said arc and connected to the alternating current source, each of said rectifying circuits having a pair of half-wave rectifiers connected one on each side of the arc and polarized to allow unidirectional current flow through the arc, the circuits being reversely polarized to alternately conduct current for the positive and negative half cycles of the current source to supply a continuous direct current flow to said arc, saturable reactor control means having a separate self-saturable winding connected in said rectifying circuit in series with each rectifier, and switch means having a first position completing said rectifying circuits and having a second position, said switch means in said second position reversely connecting at least two of the half-wave rectifiers each in series with a self-saturating winding and in parallel with one another to establish alternately active branches in series with said arc to supply alternating current to the arc.

4. An A.C.-D.C. arc welding machine including a welding circuit adapted to selectively supply an alternating current or a direct current to an arc established between a welding electrode and a workpiece, which comprises a bridge rectifying circuit having alternately conducting branch circuits including half-wave rectifying means, each of said branch circuits being serially connected with the arc across an alternating current input, separate reactance winding means serially included in each of said branch circuits, magnetic members for said winding means, adjustable direct current saturating means on said magnetic members and inductively linked thereby to said reactance winding means to provide control of the welding current and arranged to establish saturation in the same direction as the self-saturation of said magnetic members, switch means adapted to connect said branch circuits in parallel with each other and in series with said arc in said welding circuit and having said paralleled branch circuits each including a reactance winding, and the half-wave rectifying means in said paralleled branch circuits being reversely connected with respect to said arc to supply alternating current to said arc.

5. An A.C.-D.C. arc welding machine including a welding circuit adapted to be connected to an alternating current source and to selectively supply an alternating current or a direct current to an arc established between a welding electrode and a workpiece, a bridge rectifier having four rectifying legs connected in a closed loop with one set of opposite junctions of the loop constituting a pair of input terminals adapted to be connected to said alternating current source and the other set of opposite junctions of the loop constituting a pair of output terminals adapted to be connected respectively to the electrode and the workpiece, the rectifying legs adjacent the input terminals being polarized in the opposite direction with respect to the input terminals and the rectifying legs adjacent the output terminals being in the same direction polarized with respect to the output terminals to establish alternately conducting series circuits including said arc to supply a direct current to said arc, an adjustable self-saturating reactor control means serially connected in the two rectifying legs adjacent a common input terminal, switch means adapted to short the output terminals and thereby connect the rectifying legs containing said reactance control means in parallel, and switch means adapted to connect said paralleled rectifying legs in series with the electrode and the workpiece across the source to supply alternating current to the arc.

6. An A.C.-D.C. arc welding machine including a welding circuit adapted to be connected to an alternating current source and to selectively supply an alternating current or a direct current to an arc established between a welding electrode and a workpiece, which comprises a full-wave bridge rectifying circuit having a pair of input terminals adapted to be connected to the source and a pair of output terminals adapted to be connected to said electrode, and each workpiece, load current windings serially connected one in each leg of the rectifying circuit adjacent a common input terminal, magnetic core means for said load current windings, a controllable direct current winding means to variably saturate said core means in the same direction as the self-saturation thereof, and switch means adapted to short circuit said output terminals and to disconnect one output terminal from the associated or workpiece and to disconnect one A.C. input terminal from the source and to connect the source directly to the electrode or workpiece disconnected from an output terminal to establish a pair of branch circuits each serially including a load current winding and a half-wave rectifier, said branch circuits being connected in parallel with each other and in series with said arc and having said rectifiers reversely connected with one another to supply alternating current to the arc.

7. An A.C.-D.C. arc welding machine including a welding circuit adapted to be connected to an alternating current source and to selectively supply an alternating current or a direct current to an arc established between a welding electrode and a workpiece, which comprises a full-wave bridge rectifying circuit having a first and a second input terminal adapted to be connected to opposite sides of the source and a pair of output terminals adapted to be connected one each to said electrode and said workpiece, load current windings serially connected one in each leg of the rectifying circuit adjacent the first input terminal, magnetic core means for said load current windings, a controllable direct current saturating means on said magnetic core means to variably saturate the core means in the same direction as the self-saturation thereof, and switch means adapted to short circuit said output terminals and to disconnect one output terminal from the associated electrode or workpiece and to disconnect the second input terminal from the source and connect the disconnected side of the source directly to the electrode or workpiece disconnected from said output terminal.

8. An A.C.-D.C. arc welding machine including a welding circuit adapted to be connected to an alternating current source and to selectively supply an alternating current or a direct current to an arc established between a welding electrode and a workpiece, which comprise a full-wave bridge rectifying circuit having a first and a second input terminal adapted to be connected to the source and a pair of output terminals adapted to be respectively connected one each to said electrode and said workpiece, windings serially connected one in each leg of the rectifying circuit adjacent a common input terminal, separate magnetic cores for each of the windings, a controllable direct current saturating means to variably saturate said cores in the same direction as the self-saturation thereof, and switch means adapted to short circuit said output terminals and disconnect the electrode of the workpiece therefrom and to connect the side of the current source connected to the second input terminal directly to the electrode or workpiece disconnected from the output terminal and to disconnect the legs of the rectifying circuits adjacent the second input terminal and to connect them one each in parallel with one of the rectifying elements in the legs of the rectifying circuit connected to the first input terminal to establish an alternating current welding circuit.

9. An A.C.-D.C. arc welding machine including a welding circuit adapted to be connected to an A.C. current source and to selectively supply an alternating current or a direct current to an arc established between a welding electrode and a workpiece, which comprises a full-wave bridge rectifier having four rectifying branches each including a half-wave rectifier connected in a closed loop with one pair of opposite junctions of the loop constituting a first and a second input terminal connected to said current source and the other pair of opposite junctions of the loop constituting a pair of output terminals respectively connected one each to said electrode and said workpiece, saturable reactor means including reactance windings serially connected one each with the rectifying elements in the branches connected to said first input terminal between the input terminal and the rectifying element, a pair of switch means each having a first position connecting adjacent rectifying branches to the second input terminal and having a second position connecting the rectifying branches in parallel with the rectifying elements in the branches connected to a common output terminal and disconnecting the rectifying branches from the second input terminal, second switch means adapted to short circuit the output terminals and to disconnect the output terminals from said electrode or said workpiece, and third switch means adapted to connect the disconnected electrode or workpiece to the side of the alternating current source connected to the second input terminal.

10. An A.C.-D.C. arc welding machine in accordance with claim 9 wherein said saturable reactor means comprises separate magnetic paths for each of said reactance windings and a single direct current control coil linking both of said magnetic paths and said reactance winding being arranged to self-saturate said magnetic paths.

11. An A.C.-D.C. arc welding machine in accordance with claim 9 wherein a stabilizing reactor is connected in series between the disconnected electrode or workpiece and said second switch means to stabilize the direct current supplied to the arc.

12. In a D.C. arc welding machine adapted to supply a direct current to an arc established between an electrode and a workpiece, a full-wave bridge rectifier, separate reactance windings serially connected one each in alternately active branches of said bridge rectifier, magnetic core means for said windings, and a controllable D.C. saturating means operably associated with said magnetic core means to establish self-saturation of the core means.

13. A D.C. arc welding current supply, which comprises a full-wave bridge rectifier circuit, separate reactance windings wound one each in two alternately active branches of said bridge rectifier, a pair of separate magnetic cores each linked by a different one of said reactance windings, a control winding wound on adjacent spaced portions of said cores and adapted to establish a flux in the same direction as the flux established by said reactance windings, and an adjustable source of direct current for said control winding.

14. In an arc welding circuit adapted to be connected to an alternating current source and having alternately active load current control windings to respectively carry the positive and negative portions of the current from the source to an arc, a radio frequency current source, an alternating current input to said radio frequency source, and rectifying means connecting the load current windings to said alternating current source to carry the positive and negative portions of the current from the source to said alternating current input through said load current windings and in parallel with the welding current to establish a radio frequency voltage in the absence of the flow of normal welding current and to establish a reduced radio frequency voltage in the presence of welding current.

15. In an arc welding circuit adapted to be connected to an alternating current source and having alternately active load current control windings to respectively carry the positive and negative portions of the current from the source to an arc, a radio frequency current generator, an alternating current input to said radio frequency generator, and a pair of oppositely polarized rectifying means connected in parallel with each other and in series one each with each of said load current windings and in series with said alternating current input across said alternating current source.

16. In an arc welding circuit adapted to be connected to an alternating current source and to establish and maintain an arc between a welding electrode and a workpiece, a pair of branch circuits each including a half-wave load rectifying means and a load current control winding connected in series, means to connect said branch circuits in series with the electrode and the workpiece across the current source, said branch circuits selectively transmitting the positive portion of the source current and the negative portion of the source current, a radio frequency generator adapted to supply a radio frequency current to said welding circuit and having an input winding connected to one side of the current source, half-wave control rectifying means connected to the junction of said load rectifying means and said control winding of one of said branch circuits and to one side of the input winding, a second half-wave control rectifying means connected to the junction of said load rectifying means and said control winding of the other of said branch circuits and reverse connected to the same side of the input winding as said first named control rectifying means, and means connecting the opposite side of said input winding to said current source to supply current to said input winding through said control rectifying means.

17. In an alternating current arc welding circuit adapted to provide an alternating current to an arc, saturable reactor control means in said arc welding circuit to control the current supplied to the arc, and circuit means in said arc welding circuit to reduce the D.C. component established by said arc.

18. In an alternating current arc welding circuit adapted to supply an alternating current to an arc established between an electrode and a workpiece, alternately active load current windings carrying corresponding positive and negative portions of the arc welding current, magnetic core means for said load current windings, means to saturate said core means to control the current output, and means to adjust the relative reactance of the load current windings to reduce the D.C. current component established by the arc.

19. In an alternating current arc welding circuit adapted to supply an alternating current to an arc established between an electrode and a workpiece, a pair of branch circuits connected in parallel with each other in said arc welding circuit and in series with the arc, each of said branch circuits including a load current winding and a half-wave rectifier connected in series, said half-wave rectifiers being reverse connected with respect to each other to alternately pass corresponding positive and negative portions of the arc welding current, magnetic core means for said load current windings, direct current saturating means wound on said core means to establish self saturation of the core means to control the welding current supplied to the arc, a resistance connected in series in one of said branch circuits, and means to vary the reactance of the load current windings relative to each other.

20. In an alternating current arc welding circuit adapted to supply an alternating current to an arc established between an electrode and a workpiece, a pair of branch circuits connected in parallel with each other in said arc welding circuit and in series with the arc, each of said branch circuits including a load current winding and a half-wave rectifier connected in series, said half-wave rectifiers being reverse connected with respect to each other to alternately pass corresponding positive and negative portions of the arc welding current, magnetic core means for said load current windings, direct current saturating means wound on said core means to establish self saturation of the core means to control the welding current supplied to the arc, a resistance connected in series in one of said branch circuits, and a tapped connection on at least one of said load current windings to increase the reactance of the load current connected in series with said resistance with respect to the reactance of the other load current winding.

References Cited in the file of this patent
UNITED STATES PATENTS

| | | |
|---|---|---|
| 2,065,663 | Dicke | Dec. 29, 1936 |
| 2,099,715 | Young | Nov. 23, 1937 |
| 2,126,790 | Logan | Aug. 16, 1938 |
| 2,777,973 | Steele et al. | Jan. 15, 1957 |